US011719901B2

(12) United States Patent
Cox et al.

(10) Patent No.: US 11,719,901 B2
(45) Date of Patent: Aug. 8, 2023

(54) DENSE WAVELENGTH DIVISION MULTIPLEXING FIBER OPTIC APPARATUSES AND RELATED EQUIPMENT

(71) Applicant: CORNING RESEARCH & DEVELOPMENT CORPORATION, Corning, NY (US)

(72) Inventors: Terry Dean Cox, Fort Worth, TX (US); Dong Gui, San Jose, CA (US); Lingling Hu, Fort Worth, TX (US); Scott William Ramsdell, Charlotte, NC (US); Diana Rodriguez, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/592,660

(22) Filed: Feb. 4, 2022

(65) Prior Publication Data

US 2022/0155545 A1    May 19, 2022

Related U.S. Application Data

(62) Division of application No. 17/031,088, filed on Sep. 24, 2020.

(60) Provisional application No. 62/908,165, filed on Sep. 30, 2019.

(51) Int. Cl.
*H04B 10/25*    (2013.01)
*G02B 6/44*     (2006.01)
*H04J 14/02*    (2006.01)

(52) U.S. Cl.
CPC ......... *G02B 6/4454* (2013.01); *G02B 6/4452* (2013.01); *H04B 10/25* (2013.01); *H04J 14/02* (2013.01); *H04J 14/0228* (2013.01)

(58) Field of Classification Search
CPC .... G02B 6/4454; G02B 6/4452; H04B 10/25; H04J 14/02; H04J 14/0228
USPC .......................................................... 398/24
See application file for complete search history.

(56) References Cited

U.S. PATENT DOCUMENTS

| | | |
|---|---|---|
| 10,018,787 B1 | 7/2018 | Wang et al. |
| 10,182,275 B1 | 1/2019 | Xiao et al. |
| 10,389,473 B1 | 8/2019 | Vassilieva et al. |
| 10,715,271 B1 | 7/2020 | Cox et al. |
| 10,809,480 B1 | 10/2020 | Cox et al. |
| 11,221,455 B2 | 1/2022 | Berdan et al. |
| 2003/0072553 A1 | 4/2003 | Bosisio et al. |
| 2010/0158530 A1 | 6/2010 | Soto et al. |
| 2015/0055954 A1 | 2/2015 | Gronvall et al. |
| 2015/0117872 A1 | 4/2015 | Lyubomirsky |
| 2015/0378112 A1 | 12/2015 | Marcouiller et al. |

(Continued)

FOREIGN PATENT DOCUMENTS

| | | | | |
|---|---|---|---|---|
| CN | 202221485 U | * | 5/2012 | ............... G02B 6/38 |
| CN | 102804013 A | * | 11/2012 | ............... G02B 6/44 |

(Continued)

*Primary Examiner* — Mohammad R Sedighian

(57) ABSTRACT

A fiber optic assembly is provided including a body defining a fiber routing volume, a plurality of fiber optic components disposed in a front side of the body, and a plurality of optical filters disposed within the volume. The plurality of optical filters enable at least twenty four (24) dense wavelength division multiplexing (DWDM) channels.

9 Claims, 17 Drawing Sheets

(56) References Cited

U.S. PATENT DOCUMENTS

| | | |
|---|---|---|
| 2016/0161672 A1 | 6/2016 | Bauco et al. |
| 2016/0301191 A1 | 10/2016 | Orcutt |
| 2017/0131474 A1 | 5/2017 | Dannenberg et al. |
| 2018/0062756 A1 | 3/2018 | Ho et al. |
| 2018/0074275 A1 | 3/2018 | Thompson et al. |
| 2018/0091251 A1 | 3/2018 | Hanneman, Jr. |
| 2018/0156988 A1* | 6/2018 | Gniadek .............. H01R 13/506 |
| 2018/0248644 A1 | 8/2018 | Gronvall et al. |
| 2019/0037286 A1 | 1/2019 | Ghuman et al. |
| 2019/0123819 A1 | 4/2019 | Jiang |
| 2019/0140765 A1 | 5/2019 | Ghuman |
| 2019/0149260 A1 | 5/2019 | Cai et al. |
| 2019/0158211 A1 | 5/2019 | Furst et al. |
| 2020/0012047 A1 | 1/2020 | Wu |
| 2021/0055495 A1* | 2/2021 | Brewster .............. G02B 6/4452 |
| 2021/0080671 A1 | 3/2021 | Bell et al. |

FOREIGN PATENT DOCUMENTS

| | | | | |
|---|---|---|---|---|
| CN | 104487880 A | * | 4/2015 | ............... G02B 6/38 |
| CN | 205139428 U | | 4/2016 | |
| CN | 208477150 U | | 2/2019 | |
| CN | 105516830 B | * | 3/2019 | ............. H04Q 11/00 |
| JP | 2005-257940 A | | 9/2005 | |
| WO | 2015/022531 A1 | | 2/2015 | |
| WO | 2019/195652 A1 | | 10/2019 | |
| WO | 2021/041686 A1 | | 3/2021 | |
| WO | 2022/192479 A1 | | 9/2022 | |

* cited by examiner

DENSE WAVELENGTH DIVISION MULTIPLEXING FIBER OPTIC APPARATUSES AND RELATED EQUIPMENT

PRIORITY APPLICATION

This application is a divisional of U.S. application Ser. No. 17/031,088, filed on Sep. 24, 2020, which claims the benefit of priority to U.S. Application No. 62/908,165, filed on Sep. 30, 2019, both applications being incorporated herein by reference.

BACKGROUND

Field of the Disclosure

The technology of the disclosure relates to dense wavelength division multiplexing provided in fiber optic apparatuses and equipment.

Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections. For example, the fiber optic equipment can support interconnections between servers, storage area networks (SANs), and other equipment at data centers. Interconnections may be supported by fiber optic patch panels or modules.

The transition to deep fiber architectures, such as Remoter Phy Distribution (RPD) or 5G, significantly transforms the nature of traditional head ends into large scale 10G switched network centers. Although similar to large scale datacenters—where large strand count fiber trunks are used to interconnect the massive amount of switch ports—the distribution of individual "ports" in neighborhood nodes dramatically drives up strand counts for outside plant (OSP) fiber trunks in the same manner. OSP fiber optic network typically employ wavelength division multiplexing (WDM) technology, and particularly dense wavelength division multiplexing (DWDM) to more efficiently transport traffic. However, the resulting large scale deployment of WDM and DWDM filtering introduces new challenges for space density, channelization efficiency, and cross connection methodology.

Wavelength division multiplexing (WDM) multiplexes a number of optical carrier signals onto a single optical fiber by using different wavelengths of light. This technique enables bidirectional communications over one strand of fiber, as well as multiplication of capacity. WDM modules may utilize a plurality of optical filters, e.g. bandpass filters and channel filters, to isolate wavelengths for each channel. Some representative optical filters may include thin film filters (TTFs) and arrayed wave guide (ARG) filters. Dense wavelength division multiplexing (DWDM) increases the number of channels that can be transmitted over a single optical fiber by reducing the spacing between channels, such as 0.8/0.4 nm (100 GHz/50 GHz grid). However, when using filter methods for a DWDM deployment, an increase in the number of channels requires a corresponding increase in the number of filters. Each additional filter consumes additional space in a fiber optic assembly or module.

SUMMARY OF THE DETAILED DESCRIPTION

Embodiments disclosed in the detailed description include a high density dense wavelength division multiplexing (HD-DWDM) solution to enable effective scaling of deep fiber networks. The fiber optic apparatus may include a chassis including a plurality of assemblies utilizing very small form factor fiber optic connection components, such as MDC connectors. The MDC connector arrangement may enable a fiber optic connection density of four hundred thirty-two (432) fiber optic connections per U space. In some embodiments, the MDC connector arrangement may enable a fiber optic connection density of four hundred eighty-six (486) fiber optic connections per U space. In an example embodiment, the MDC connector arrangement may enable a fiber optic connection density of at least five hundred fifty-eight (558) fiber optic connections per U space.

In an example embodiment, a fiber optic apparatus is disclosed that includes a chassis including a plurality of fiber optic assemblies configured to support a fiber optic connection density of at least two hundred eighty-eight (288) wavelength division multiplexing (WDM) channels per U space using fiber optic connection components, such as MDC connectors. In some example embodiments, the chassis is configured to support a fiber optic connection density of at least three hundred sixty (360) WDM channels per U space. In an example embodiment, the WDM channels are dense wavelength division multiplexing (DWDM) channels.

In some example embodiments, a fiber optic assembly is provided including a body defining an fiber routing volume. The fiber routing volume of the fiber optic assembly may be defined by sides of the body that are not fully enclosed such as a tray, or a tray with at least one wall, ledge, or ridge. In some example embodiment, the fiber optic routing volume may be substantially enclosed, fully enclosed, or hermetically sealed, these configurations may be generally referred to as a fiber optic module. In an exemplary embodiment, a plurality of fiber optic connection components are disposed in a front side of the body and a plurality of optical filters are disposed within the fiber routing volume. The plurality of optical filters facilitate at least a plurality of dense wavelength division multiplexing (DWDM) channels. For example, eight (8) DWDM channels, twelve (12) DWDM channels, twenty four (24) DWDM channels, thirty-six (36) DWDM channels, forty-eight (48) DWDM channels, or the like. The optical filters may include a plurality of optical fiber components such as bandpass filters and a plurality of DWDM channel filters, which may be thin film filters (TTFs), arrayed wave guide (AWG) filters, or other suitable optical filters. In an example embodiment, at least some of the optical filters may be retained in a predetermined position by a plurality of filter cradles. The fiber optic assemblies may also include a plurality of fiber routing guides configured to route optical fibers in a way that avoids optical attenuation due to bending, for example, a figure eight pattern can be used between the plurality of optical filters. The fiber routing guides and/or the filter cradle position may be arranged to enable a fiber routing scheme which avoids sharp bends or optical attenuation, for example, having bend radii of greater than about 15 mm.

In a further example embodiment, a fiber optic system is provided including a first fiber optic assembly that includes a first plurality of optical filters configured to enable a first at least twenty four (24) dense wavelength division multiplexing (DWDM) channels, test channels, an express port, and an upgrade port. The system may be expanded by adding a second fiber optic assembly having a second plurality of optical filters configured to enable a second at least twenty four (24) DWDM channels. The expansion from 24 DWDM channels to a 48 DWDM channels, by connecting two (2) twenty four (24) DWDM channels assemblies together, is realized by connecting the upgrade port of the first assembly to the input port of the second assembly. The test channels and the express port are utilized for the first fiber optic assembly and the second fiber optic assembly, thereby reducing an accumulated signal attenuation. The test channels, which can be used to monitor and trouble shoot for a network link, and the express port is designed to get quick access to the spectrum that is not used in the fiber optic assembly. The DWDM channels are concatenated so as to get a signal for each DWDM port out of the input light. In some example embodiments, the first fiber optic assembly may include a loopback feature that is configured to pass an optical signal through from an input to an output that can be looped back to a second input to the optical filters. Alternatively, the output of the first fiber optic assembly may be connected to an input of the second fiber optic assembly and an output of the second fiber optic assembly may be connected to the second input of the fiber optic assembly. In this manner, the fiber optic system may be expanded from 24 channels to 48 channels while maintaining the multiplexing order and demultiplexing order both inside plant (ISP) and outside plant (OSP).

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic apparatuses that provide and comprise a chassis defining one or more U space fiber optic equipment units, wherein at least one of the one or more U space fiber optic equipment units is configured to support a given fiber optic connection density or WDM channel density in a 1-U space, and for a given fiber optic component, e.g. connector or adapter, type(s).

Figure 1:
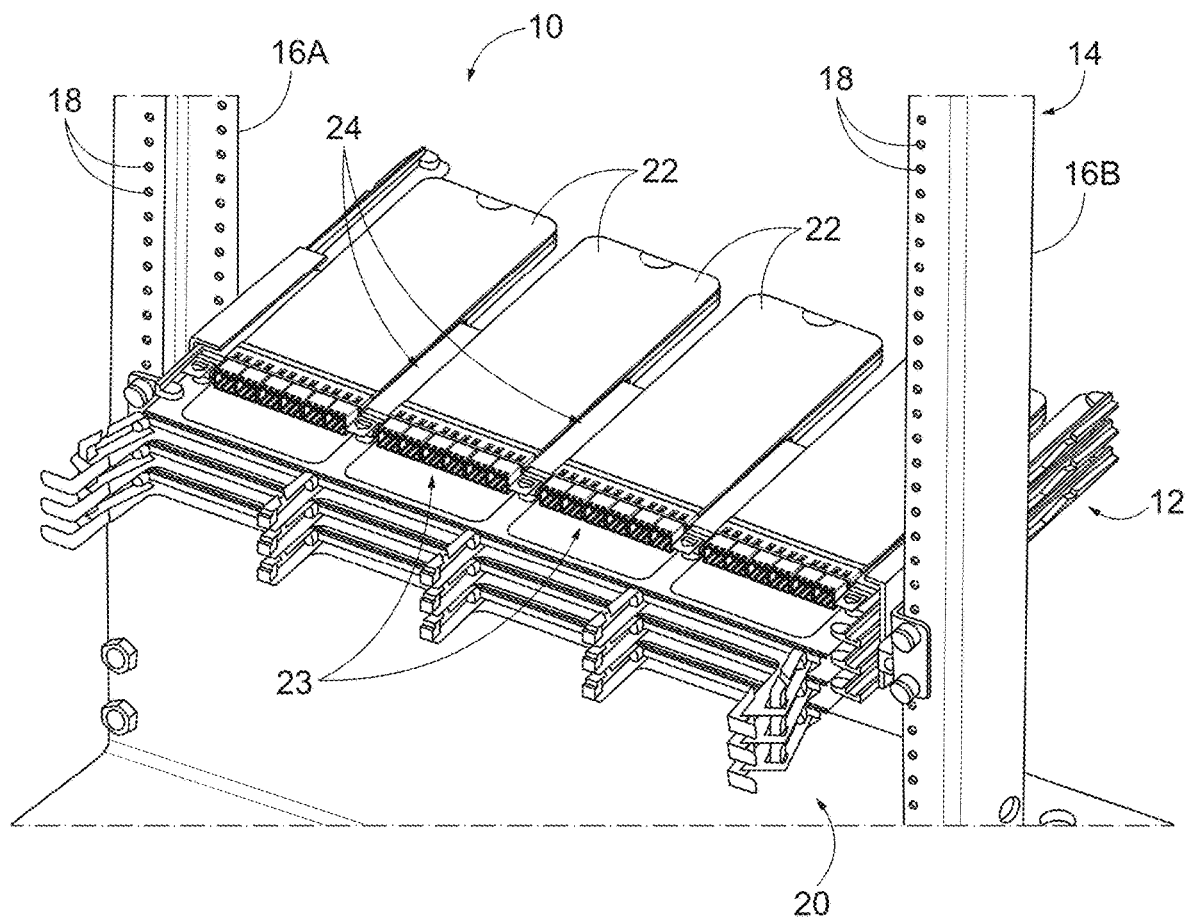
FIG. 1 is a front perspective view of an exemplary fiber optic equipment rack with an installed exemplary 1-U size chassis supporting high-density fiber optic modules to provide a given fiber optic connection density and bandwidth capability, according to an example embodiment.

In this regard, FIG. 1 illustrates exemplary 1-U size fiber optic equipment 10 from a front perspective view. The fiber optic equipment 10 supports high-density fiber optic assemblies that support a high fiber optic connection density and bandwidth in a 1-U space, as will be described in greater detail below. The fiber optic equipment 10 may be provided, for example, at a data distribution center or central office, to support cable-to-cable fiber optic connections and to manage a plurality of fiber optic cable connections. As will be described in greater detail below, the fiber optic equipment 10 has one or more fiber optic equipment trays 20 that each support one or more fiber optic assemblies. Here, the fiber optic assemblies are substantially enclosed fiber optic modules 22. Fiber optic modules 22 are used throughout the specification of illustrative purposes, however, fiber optic assemblies that are not substantially enclosed may also be used. In addition to the fiber optic modules 22, the fiber optic equipment 10 could also be adapted to support one or more fiber optic patch panels, or other fiber optic equipment, that supports fiber optic components and connectivity.

The fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the chassis 12 inside the fiber optic equipment rack 14. In some example embodiments, the chassis 12 may include a housing surrounding at least a portion of the chassis 12. The chassis 12 is attached and supported by the fiber optic equipment rack 14 in the form of shelves that are stacked on top of each other within the vertical rails 16A, 16B. As illustrated, the chassis 12 is attached to the vertical rails 16A, 16B. The fiber optic equipment rack 14 may support 1-U-sized shelves, with "rack unit" or "U" equal to 1.75 inches in height and nineteen (19) inches in width, as specified in EIA-310-D; published by the Electronic Industries Alliance. In certain applications, the width of "U" may be twenty-three (23) inches. Also, the term fiber optic equipment rack 14 should be understood to include structures that are cabinets, as well. In this embodiment, the chassis 12 is 1-U in size; however, the chassis 12 could be provided in a size greater than 1-U as well, such as 2-U, 4-U, or the like.

The fiber optic equipment 10 includes a plurality of fixed or extendable fiber optic equipment trays 20 that each carries one or more fiber optic assemblies or fiber optic modules 22. Each fiber optic equipment tray may include one or more module guides rails 24 configured to slidably receive the fiber optic modules 22. In an example embodiment, the fiber optic modules may be installable from either the front of the fiber optic equipment trays 20 the rear of the fiber optic equipment trays, or both. The chassis 12 and fiber optic equipment trays 20 support fiber optic modules 22 that support high-density fiber optic connection density and/or high density WDM channel density in a given space, including in a 1-U space.

FIG. 1 shows exemplary fiber optic components 23 disposed in the fiber optic modules 22 that support fiber optic connections. For example, the fiber optic components 23 may be fiber optic adapters or fiber optic connectors. As will also be discussed in greater detail later below, the fiber optic modules 22 in this embodiment can be provided such that the fiber optic components 23 can be disposed through at least about eighty-five percent (85%) of the width of the front side or face of the fiber optic module 22, as an example. The fiber optic module 22 may include one or more fiber optic components 23. For example, the fiber optic components may include multi-fiber push-on/pull-off (MPO) connectors or adapters (e.g., according to IEC 61754-7). In some examples, the fiber optic components 23 include very-small form factor (VSFF) duplex connectors or adapters, such as MDC connectors or adapters (sometimes referred to as "mini duplex connectors") offered by U.S. Conec, Ltd. (Hickory, N.C.), and SN connectors or adapters (sometimes referred to as a Senko Next-generation connectors) offered by Senko Advanced Components, Inc. (Marlborough, Mass.). Such VSFF connectors or adapters may be particularly useful in the structured optical fiber cable systems in this disclosure, and will be referred to generically as "dual-ferrule VSFF components" due to their common design characteristic of the connectors having two single-fiber ferrules within a common housing (and the adapters being configured to accept such connectors). As used herein duplex connectors include two optic fibers, one transmit optical fiber and one receive optical fiber. A multi-fiber fiber optic component, as used herein includes more than two optical fibers.

This fiber optic module 22 configuration may provide a front opening of approximately 90 millimeters (mm) or less wherein fiber optic components 23 can be disposed through the front opening and at a fiber optic connection density of at least one fiber optic connection per approximately 2 mm of width or less of the front opening of the fiber optic modules 22 for dual-ferrule VSFF adapters, such as SN connector adapters or an MDC connector adapter. Reference below to MDC connectors and adapters, is merely for illustrative purposes and other duplex fiber optic components, e.g. connectors and associated adapters, may also be used. In this example, eighteen (18) duplex fiber optic components may be installed in each fiber optic module 22. The fiber optic equipment trays 20 in this embodiment support up to four (4) of the fiber optic modules 22 in approximately the width of a 1-U space, and three (3) fiber optic equipment trays 20 in the height of a 1-U space for a total of twelve (12) fiber optic modules 22 in a 1-U space. Thus, for example, if eighteen (18) duplex fiber optic components were disposed in each of the twelve (12) fiber optic modules 22 installed in fiber optic equipment trays 20 of the chassis 12 as illustrated in FIG. 1, a total of four hundred thirty two (432) fiber optic connections, or two hundred sixteen (216) duplex channels (i.e., transmit and receive channels), would be supported by the chassis 12 in a 1-U space.

Figure 2A:
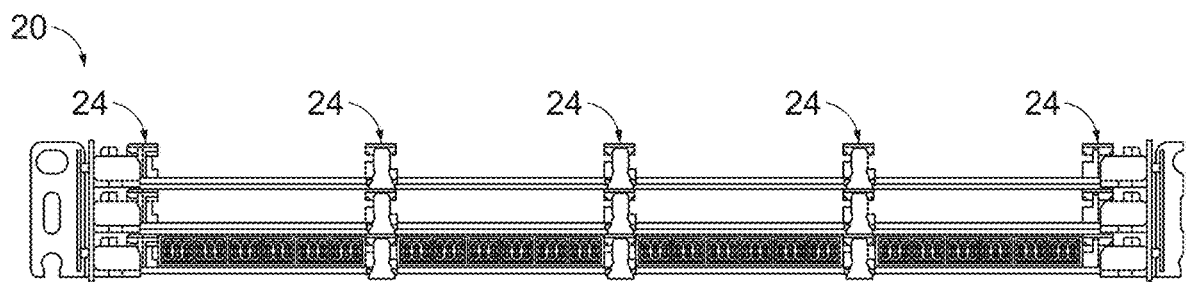
FIGS. 2A-2D are front views of various configurations of the chassis of FIG. 1; according to an embodiments.
Figure 2B:
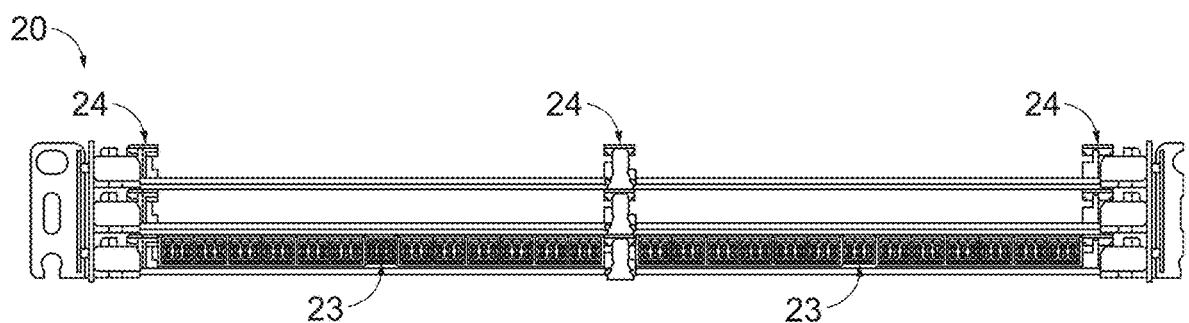
Figure 2C:
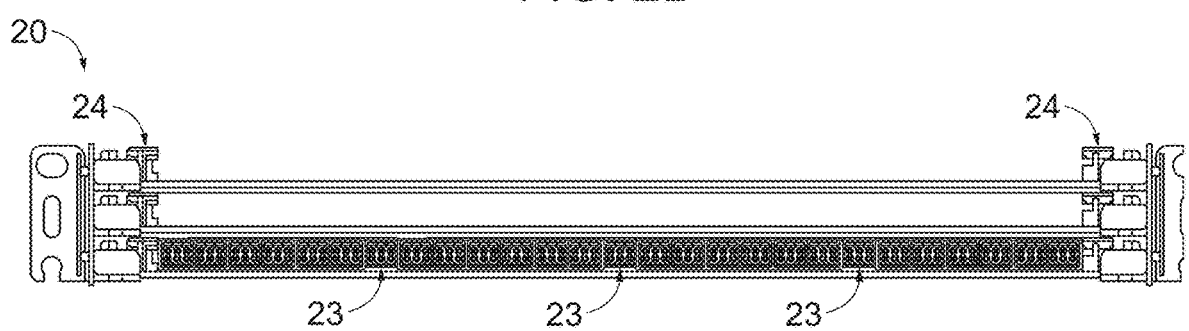
Figure 2D:
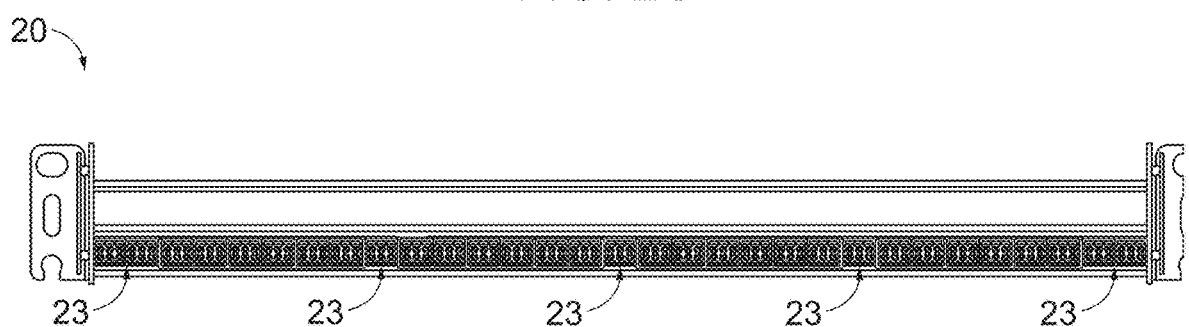

In the example depicted in FIG. 1, the fiber optic equipment trays 20 include module guide rails 24 disposed on each edge and three module guide rails 24 disposed at intermediate locations, between each of the fiber optic modules 22. In other embodiments, one or more of the module guide rails 24 may be removed or may be selectively removable, such as by snap fit or fasteners. Removing one or more of the guide rails 24 may enable a larger fiber optic module to be utilized which has a larger front side face than two smaller fiber optic modules. This larger front side face may accommodate additional fiber optic components 23. For example, FIG. 2A illustrates fiber optic equipment trays 20 including three module guide rails 24 at intermediate positions and two guide rails 24 disposed at edge positions. The depicted fiber optic tray 20 may receive four (4) fiber optic modules 22 each having eighteen (18) duplex fiber components for a total of one forty-four (144) optical fiber connections per tray and four hundred thirty two (432) optical fiber connections per 1-U space. In FIG. 2B, two intermediate guide rails 24 may be removed enabling additional fiber optic components 23 to be added. In the depicted fiber optic tray 20, six (6) additional duplex connection ports are added for a total of one hundred fifty-six (156) optical fiber connections per tray and four hundred sixty-eight (468) optical fiber connections per 1-U space. In FIG. 2C, an additional intermediate guide rail 24 may be removed enabling additional fiber optic components 23 to be added. In the depicted fiber optic tray 20, three (3) additional duplex connection ports are added for a total of one hundred sixty-two (162) optical fiber connections per tray and four hundred eighty-six (486) optical fiber connections per 1-U space. In FIG. 2D, edge guide rails 24 may be removed enabling additional fiber optic components 23 to be added. In the depicted fiber optic tray 20, twelve (12) additional duplex connection ports are added for a total of one hundred eighty-six (186) optical fiber connections per tray and five hundred fifty-eight (558) optical fiber connections per 1-U space.

Figure 3A:
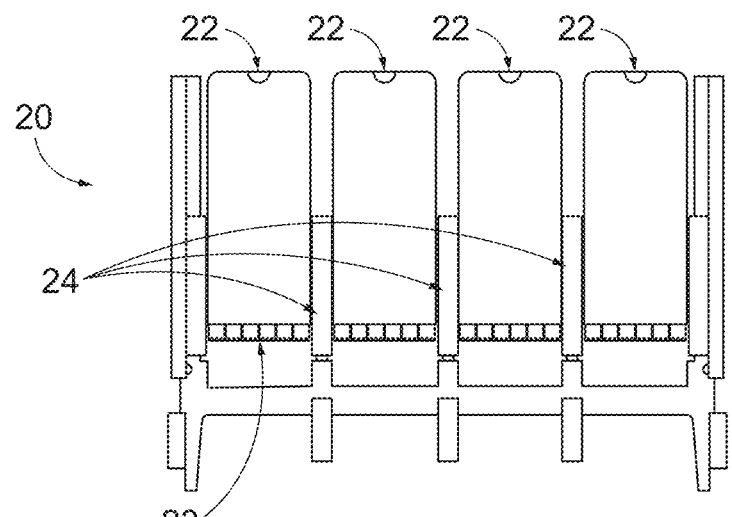
FIGS. 3A-3C are top views of one fiber optic equipment tray with installed fiber optic modules in various configurations and configured to be installed in the chassis of FIG. 1, according to example embodiments.
Figure 3B:
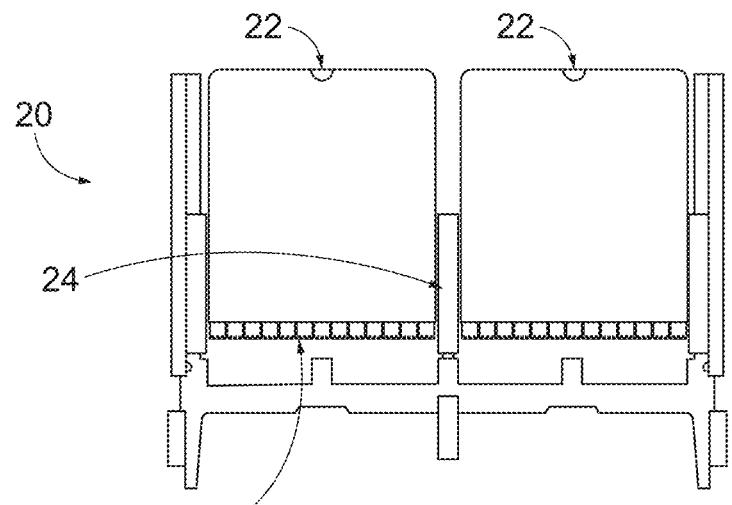
Figure 3C:
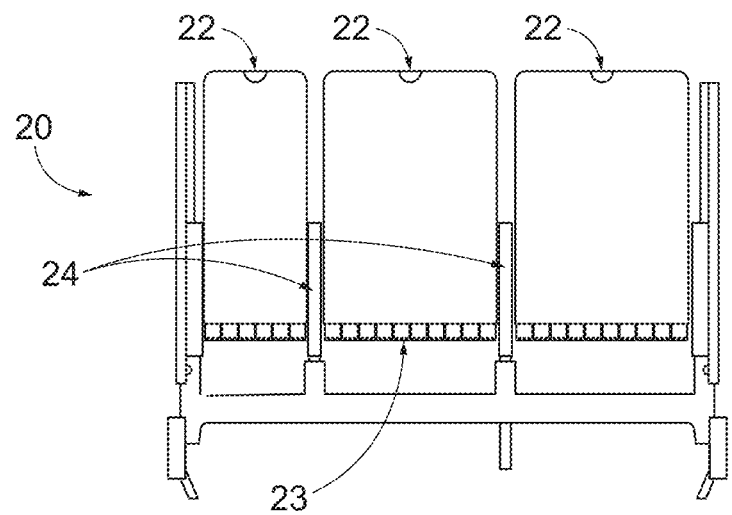

Turning to FIGS. 3A-3C, utilizing different module guide rail 24 configurations different size fiber optic modules may be supported by the fiber optic trays 20. These fiber optic modules 22 may be configured to support a number of WDM or DWDM channels based on the fiber routing volume of the fiber optic module 22 and/or the number of fiber optic components 23 available on the fiber optic module 22. In the example depicted in FIG. 3A, the fiber optic equipment tray 20 may include four (4) fiber optic modules 22 configured to support 24 DWDM channels for a total of ninety-six (96) DWDM channels per fiber optic tray 20 and a total of two hundred eighty-eight (288) DWDM channels per 1-U space. In the example depicted in FIG. 3B, two (2) fiber optic modules 22 are provided on each of the three (3) fiber optic trays 20. Due to the larger fiber routing volume and/or the larger number of fiber optic components 23 per module, each of the fiber optic modules 22 may be configured to support forty-eight (48) DWDM channels for a total of ninety-six (96) DWDM channels per fiber optic tray 20 and a total of two hundred eighty-eight (288) DWDM channels per 1-U space. Alternatively, the chassis 12 may include two (2) fiber optic trays, and the fiber optic trays may include two (2) fiber optic modules 22 configured to support forty-eight (48) DWDM channels for a total of ninety-six (96) DWDM channels per fiber optic tray 20 and a total of one hundred ninety-two (192) DWDM channels per 1-U space. In the example depicted in in FIG. 3C, the width of the fiber optic modules may be configured to maximize DWDM channel density. This fiber optic tray 20 includes two (2) fiber optic modules configured to support forty-eight DWDM channels and one (1) fiber optic module 22 configured to support twenty-four (24) DWDM channels for a total of one hundred (120) DWDM channels per fiber optic tray 20 and three hundred sixty (360) DWDM channels per 1-U space.

Figure 4:
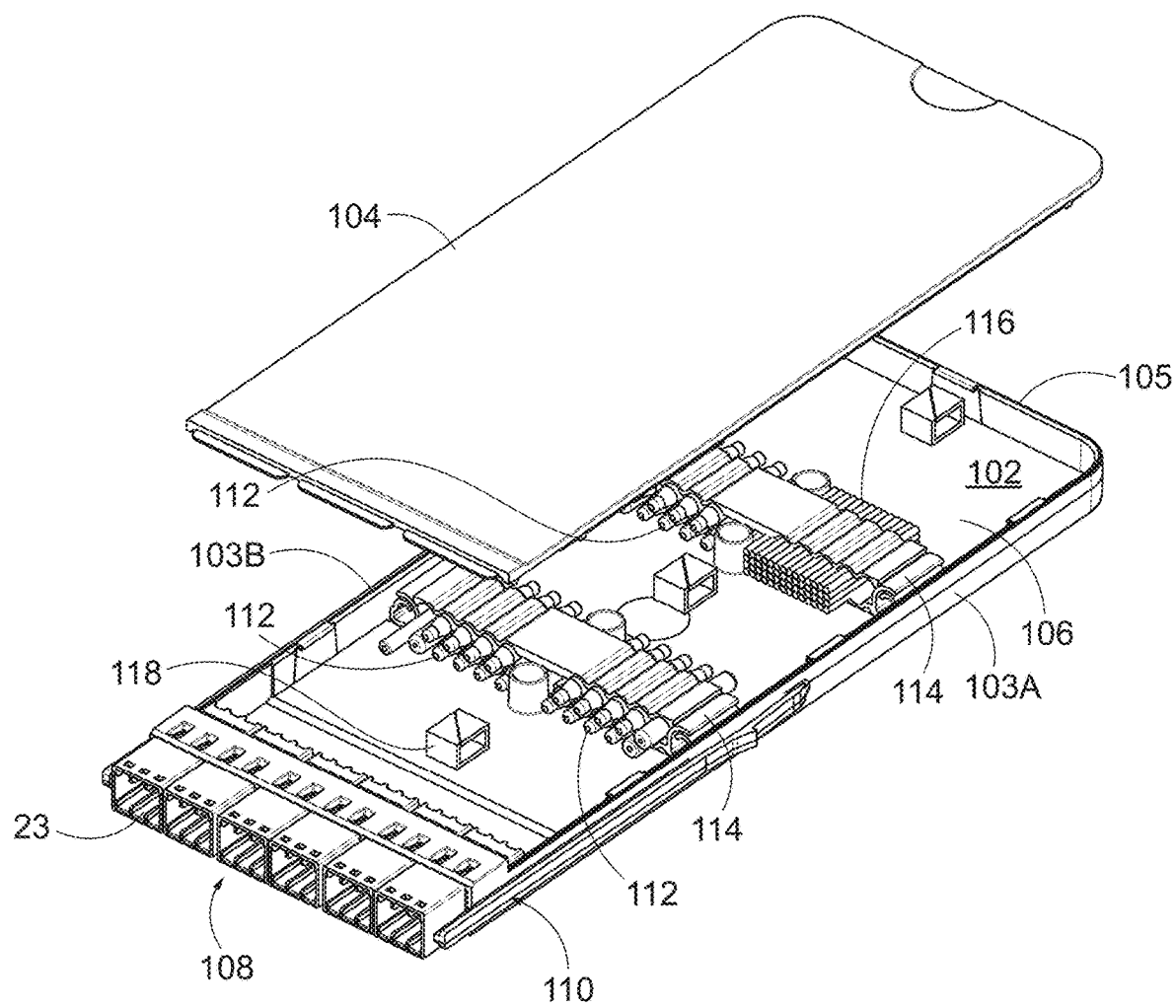
FIG. 4 is a perspective view of a fiber optic module of with a cover open, according to an example embodiment.

FIG. 4 is perspective views of an exemplary fiber optic assembly, particularly a substantially enclosed fiber optic module 22, as described above. The fiber optic assembly may include a base or body 102 configured to support a fiber optic arrangement. The body 102 may define a fiber routing volume, which may be fully, or partially enclosed as described below, or may be generally unenclosed. For example, the fiber routing volume defined by the body 102 of the fiber optic assembly may be fully enclosed, or a hermetically sealed volume, or it can be a volume defined by sides of the fiber optic assembly that are not fully enclosed, such as a support base, or a support base with at least one wall, ledge, or ridge.

The depicted fiber optic module 22 is comprised of the body 102 receiving a cover 104. The fiber routing volume 106 is disposed inside the body 102 and the cover 104 and is configured to receive or retain optical fibers or a fiber optic cable harness, as will be described in more detail below. The body 102 is disposed between a first side edge, an opposing second side edge, and a rear edge. In an example embodiment, a first side wall 103A is disposed at the first side edge, a second sidewall 103B is disposed at the second side edge, and a rear sidewall 105 is disposed at the rear edge. The sidewalls 103A, 103B, 105 may be continuous or discontinuous. The cover may engage one or more or the sidewalls 103A, 103B, 105 and at least partially enclose the fiber routing volume. For example the side walls 103A, 103B, 105 and/or cover may include one or more complementary tabs and recesses, may be interference fit, or the otherwise engage each other.

Figure 8:
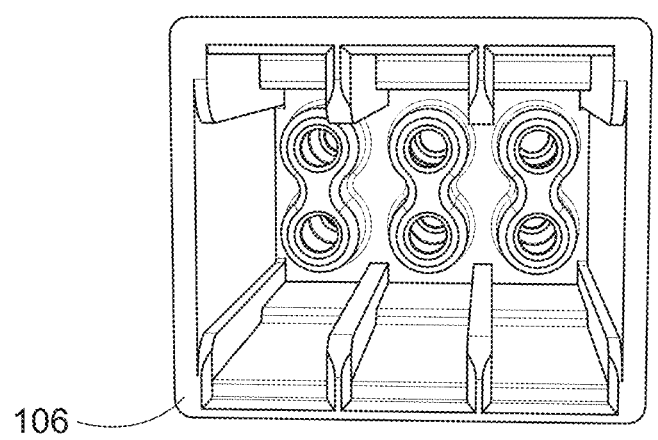
FIG. 8 is perspective view of an exemplary fiber optic component for the fiber optic modules, according to an example embodiment.

Fiber optic components 23 can be disposed through a front side 108 of the main body 102 and configured to receive fiber optic connectors connected to fiber optic cables. In this example, the fiber optic components 23 are duplex MDC fiber optic adapters that are configured to receive and support connections with duplex MDC fiber optic connectors. However, any fiber optic duplex connection type desired can be provided in the fiber optic module 22. FIG. 8 depicts one example fiber optic component 23 that includes three (3) MDC adapter ports configured to receive up to three (3) MDC connectors in a footprint of an LC (Lucent Connector) duplex connector. One or more module rails 110 are disposed on the first sidewall 103A and/or second sidewall 102B of the fiber optic module 22. The module rails 110 are configured to be inserted within the module guide rails 24 in the fiber optic equipment tray 20, as illustrated in FIG. 1. In this manner, when it is desired to install a fiber optic module 22 in the fiber optic equipment tray 20, the front side 96 of the fiber optic module 22 can be inserted from either the front end or the rear end of the fiber optic equipment tray 20.

In the depicted example, the fiber optic module 22 is configured to support a plurality of WDM channels, each WDM channel is defined by a particular optical wavelength. More particularly, the depicted fiber optic module 22 is configured to support twenty-four (24) DWDM channels. The depicted fiber optic module 22 is merely for illustrative purposes and similar configurations may be utilized to support eight (8) DWDM channels, twelve (12) DWDM channels, thirty-six (36) DWDM channels, forty-eight (48) DWDM channels, or other suitable DWDM channel densities.

FIG. 4 illustrates the fiber optic module 22 in an exploded view with the cover 104 of the fiber optic module 22 removed to illustrate the fiber routing volume 106 and other internal components of the fiber optic module 22. The fiber optic module 22 may include a plurality of optical filters 112 disposed within the fiber routing volume 106. The optical filters depicted enable at least twenty-four (24) DWDM channels, as described in further detail below. Some example optical filters 112 may include thin film filters (TFFs) and/or arrayed wave guide (AWG) filters. In a preferred embodiment, the optical filters 112 comprise TTF optical filters. The optical filters 112 may be retained in a predetermined position within the fiber routing volume 106 by one or more filter cradles 114. In an example embodiment, the fiber optic module 22 may include on or more fiber optic splice connections disposed between the optical filters 112 and the fiber optic components 23. For example the one or more fiber optic splices may be fusion splices. The one or more fusion splices may be disposed in a splice protector 116 to prevent or limit damage to the fusion splices. Alternatively, a thermoplastic layer may be used to protect the fusion slices. The thermoplastic layer may be similar to those described in U.S. patent application Ser. No. 16/573,116, titled "FIBER OPTIC CABLE ASSEMBLY WITH THERMOPLASTICALLY OVERCOATED FUSION SPLICE, AND RELATED METHOD AND APPARATUS", filed Sep. 17, 2019 the disclosure of which is fully incorporated by reference. The one or more splice protection sleeves 116 may also be disposed in one or more of the filter cradles 114. In some example embodiments, one or more fiber routing guides 118 may be disposed in the fiber routing volume 106. The configuration of the fiber routing guides 118 and optical filters 112 within the fiber routing volume 106 may enable fiber routing without bend loss. For example, the optical fibers may be routed such that the optical fibers maintain a bend radii of greater that about 15 mm, e.g. are routed to limit or prevent sharp bends. An example fiber routing pattern is described below in reference to FIG. 7B.

Figure 5A:
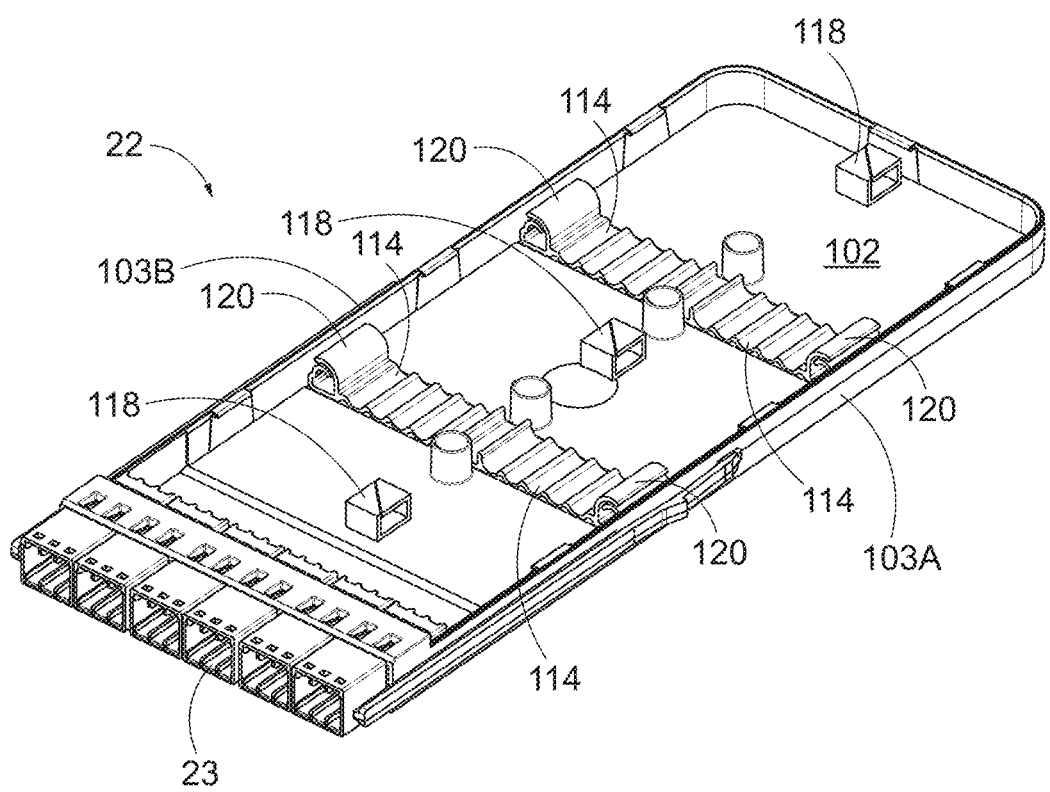
FIG. 5A is a perspective view of the fiber optic module of FIG. 4 with the cover and internal fiber components removed, according to an example embodiment.

FIG. 5A depicts a perspective view of the fiber optic module 22 with the cover 104 and internal fiber optic components removed. In an example embodiment, the filter cradles 114 and fiber routing guides 118 may be configured to route the optical fibers in a generally figure eight pattern, such as depicted in FIG. 7B. The fiber optic cradles 114 may be disposed at a first location and a second location along the length of the fiber optic module 22 to accommodate the fiber routing pattern. As such, the filter cradles 114 disposed proximate to the first sidewall 103A at about one-third (⅓) and two-thirds (⅔) the length of the fiber optic module 22 can be considered as a first set of the filter cradles 114. The filter cradles disposed proximate to the second side wall 103B at about one-third (⅓) and two-thirds (⅔) the length of the fiber optic module 22 can be considered as a second set of filter cradles 114. One or more fiber routing guides 118 may be disposed between the fiber optic components and the filter cradles 114 disposed at about one-third (⅓) the length of the fiber optic module. In some example embodiments, one or more fiber routing guides 118 are disposed between the filter cradles 114 disposed at about one-third (⅓) and the filter cradles disposed at two-thirds (⅔) the length of the fiber optic module 22. Additionally or alternatively, in some embodiments, fiber routing guides 118 may be disposed between the rear wall 105 and the filter cradles 114 The fiber routing guides 118 may be disposed at or near a centerline position in the fiber optic module 22. The fiber routing guides 118 may be formed of metal, molded plastic, or a flexible material, such as rubber. In an example embodiment, the fiber routing guides 118 may be substantially rectangular in shape, although other configurations are contemplated, such as cylindrical. The fiber routing guides 118 may include a fiber slot passing through a wall of the fiber routing guides 118. The fiber slot may enable an optical fiber to be inserted or removed from the fiber routing guide 118. In an example embodiment, the fiber slot may be formed at an angle relative to the direction of fiber routing, which may reduce inadvertent removal of a fiber from the fiber routing guide 118.

Figure 5B:
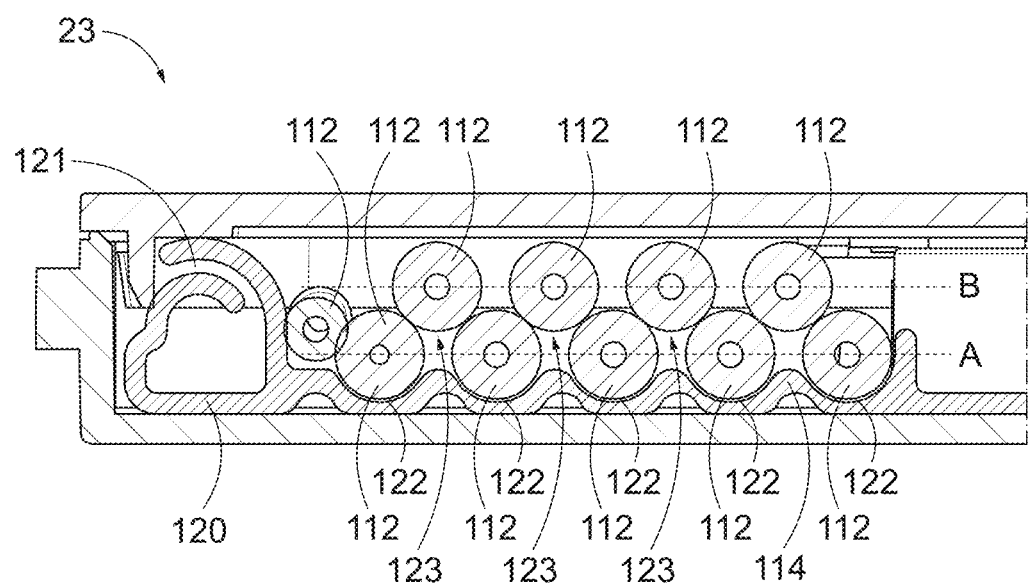
FIG. 5B is a cross-sectional view of a filter cradle, according to an example embodiment.

In some example embodiments, a fiber guide 120 is disposed at an end of the filter cradles 114, such as the end proximate the first and second sidewalls 103A, 103B. The fiber guide 120 may be separate from the filter cradle 114 or may be integral to the filter cradle 114. The fiber guide 120 may be formed including a longitudinal slot 121 (FIG. 5B) configured to receive one or more optical fibers. In some example embodiments, the longitudinal slot 121 may enable a portion of the fiber guide to overlap another portion of the fiber guide 120, as depicted in FIG. 5B. The overlapping portions of the fiber guide 120 may enable relatively easy insertion and removal of an optical fiber by a technician, but restrict inadvertent removal of the optical fiber. Similar to the fiber routing guide 118, the filter cradle 114 and/or the fiber guide 120, may be formed from metal, molded plastic or a flexible material, such as rubber.

As shown in FIG. 5B, the filter cradles 114 may include a plurality of filter troughs 122. The troughs 122 may each be configured to receive a portion of an optical filter 112. The troughs 122 may restrict lateral movement of the optical filters 112 in the filter cradle 114. Additionally, the troughs 122 may align a first row A of optical filters 112, such that valleys 123 are formed between the optical filters 112. A second row B of optical filters 112 may be disposed in the valleys 123 formed between the optical filters 112 of the first row A of optical filters 112.

Figure 6:
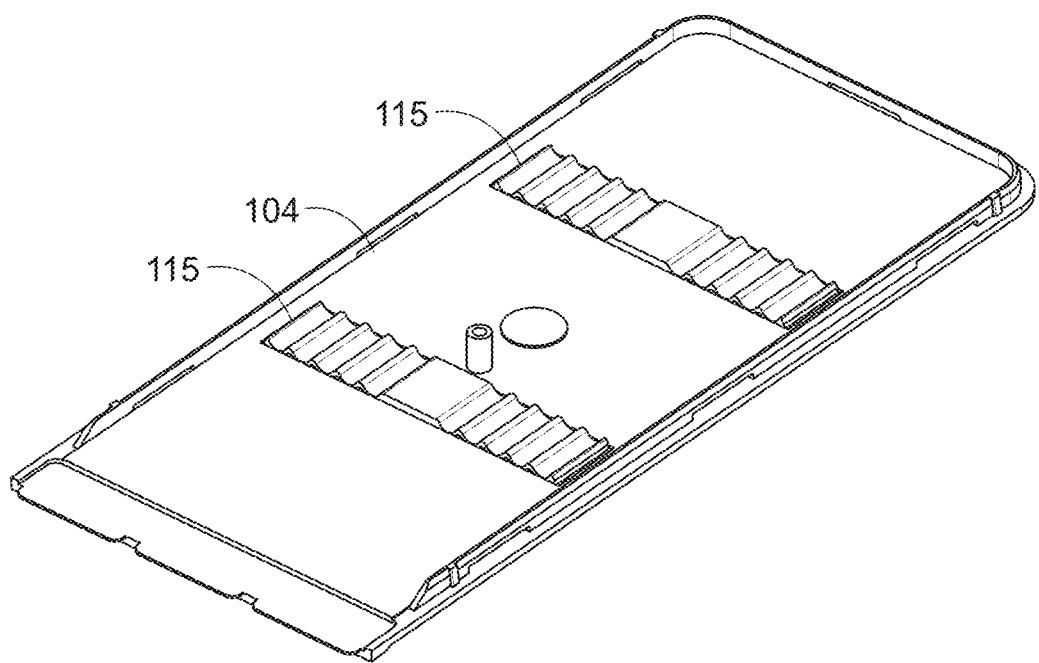
FIG. 6 is a bottom perspective view of the cover of the fiber optic module, according to an example embodiment.

FIG. 6 depicts a bottom perspective view of the cover 104 of the fiber optic module 22. In the depicted example; the cover 104 includes a cradle top 115. The cradle top 115 may be configured to restrain the top surface of the optical filters 112 disposed in the filter cradles 114. In an example embodiment, the cradle top 115 may include troughs configured to align with the second row B of optical filters 112. The cradle top 115 may be integral to, or be separate from, the cover 104. The cradle top 115 may be formed from metal, molded plastic or a flexible material, such as rubber.

Figure 7A:
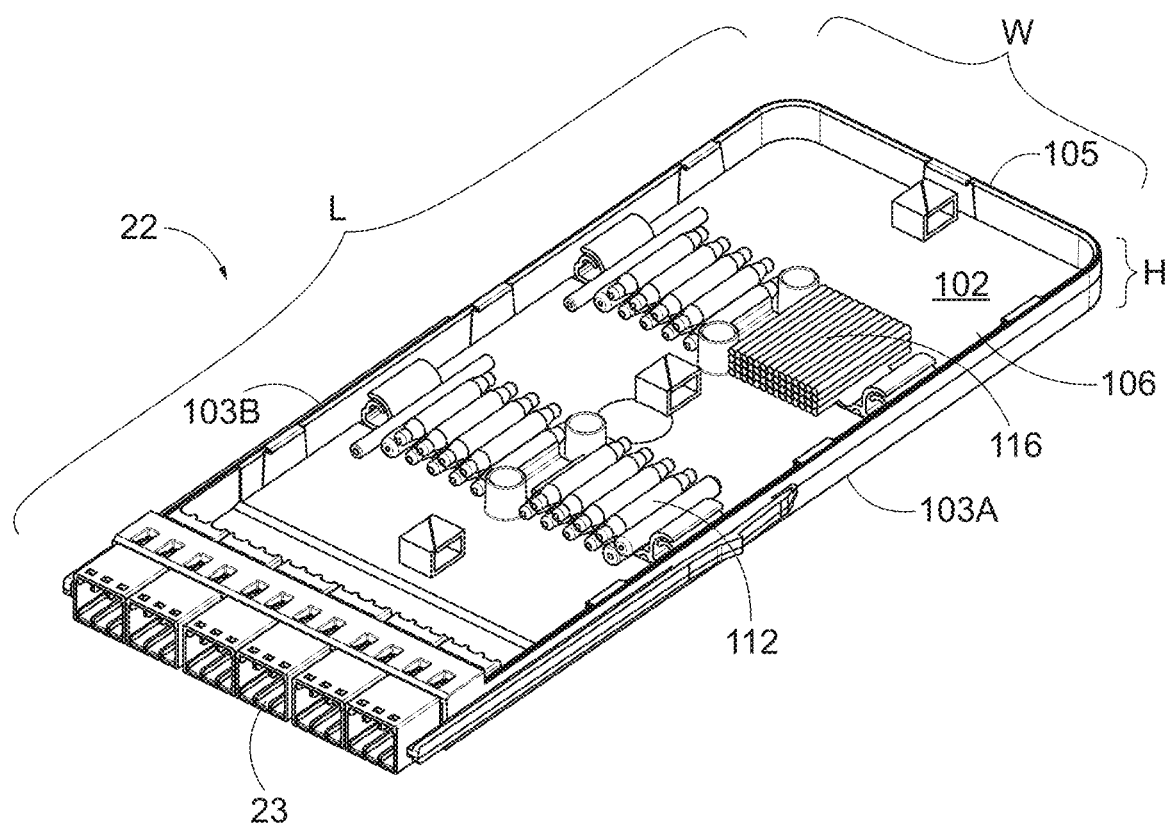
FIG. 7A is a perspective view of fiber optic module including a plurality of optical filters and splice protection sleeves, according to an example embodiment.
Figure 7B:
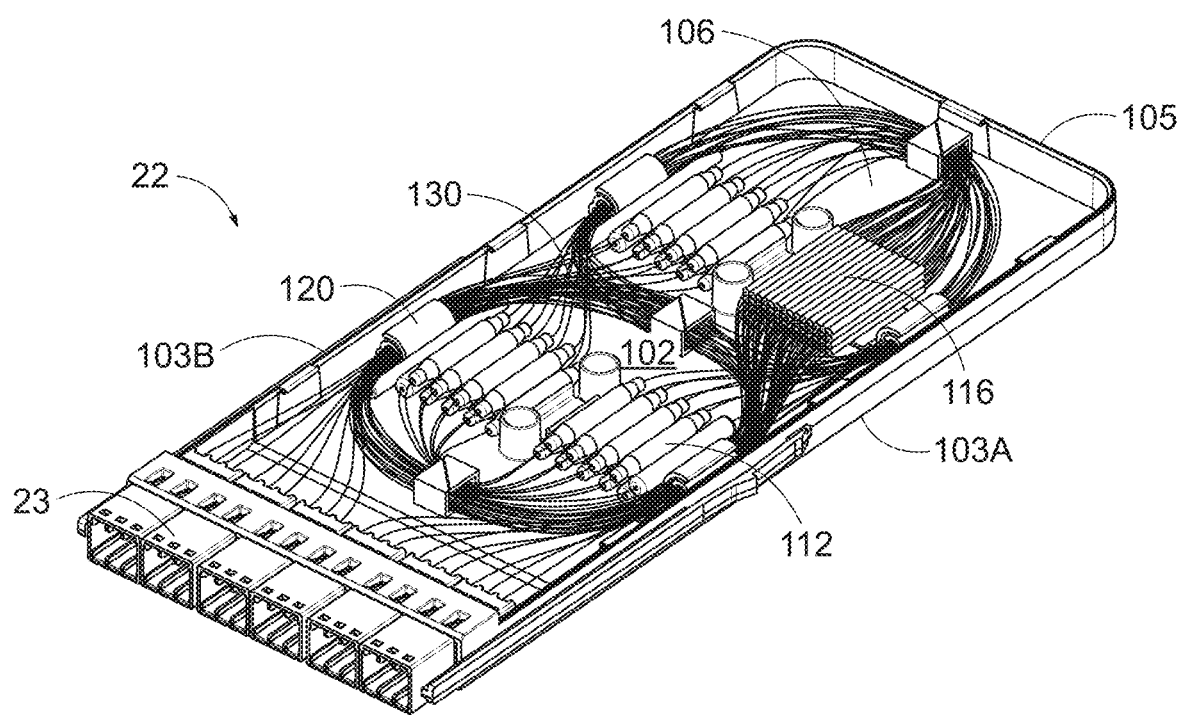
FIG. 7B is a perspective view of the fiber optic module of FIG. 7A including a plurality of optical fibers, according to an example embodiment.

FIG. 7A depicts a perspective view of fiber optic module including a plurality of optical filters 112 and splice protection sleeves 116 installed in a plurality of filter cradles 114. The optical filters 112 may be arranged to provide a particularly small the depth or height H of the fiber optic module 22. As such, the optical filters 112 may be arranged in channel groups, such as groups of eight (8) DWDM channels. The optical filters 112 for the respective eight (8) DWDM channels may be disposed in two offset rows (A and B of FIG. 5B). In an example embodiment, the height of the fiber optic module 22 may be about 12 mm. In some embodiments, additional fiber optic components may be disposed in the filter cradles 114, such as couplers, bandpass filters, or the like, as described below in reference to FIGS. 9-12. The width (W) of the fiber optic module 22 may be based on the configuration of the fiber optic components 23. For example, the depicted fiber optic module 22 includes fiber optic components 23 configured to receive 18 duplex fiber connectors, specifically MDC connectors. In this embodiment, the width (W) of the fiber optic module 22, e.g. the lateral distance between sides, is about 90 mm. The length (L) or depth of the fiber optic module 22, from the front side to a rear side, may be based on fiber routing and fiber management, such as minimizing bend loss by limiting or preventing sharp bends in the optical fibers. Referring to FIGS. 7A and 7B, the optical fibers 130 may be routed in a substantially figure eight (8) pattern, through the fiber routing guides 118, optical filters 112, splice protection sleeves 116, fiber guides 120, and the like. The optical fibers 130 may be routed to minimize bend loss caused by sharp bending, such as by maintaining a bend radii of greater than about 15 mm. In an example embodiment, the length (L) of the fiber optic module may be about 216 mm or less. In an example embodiment, optical fibers 130 may exit a fiber optic component and be routed about the periphery of the body 102, e.g. via the integral fiber guides 120, and connect to a subsequent fiber optic component. If the optical fiber needs to change direction to connect to the subsequent fiber optic component, the optical fiber 103 may be routed through the fiber routing guides 118 in a figure eight (8)

pattern. In the depicted embodiment, the volume defined by body 102 of the fiber optic module 22 may be 233,280 mm³ or less.

Figure 9A:
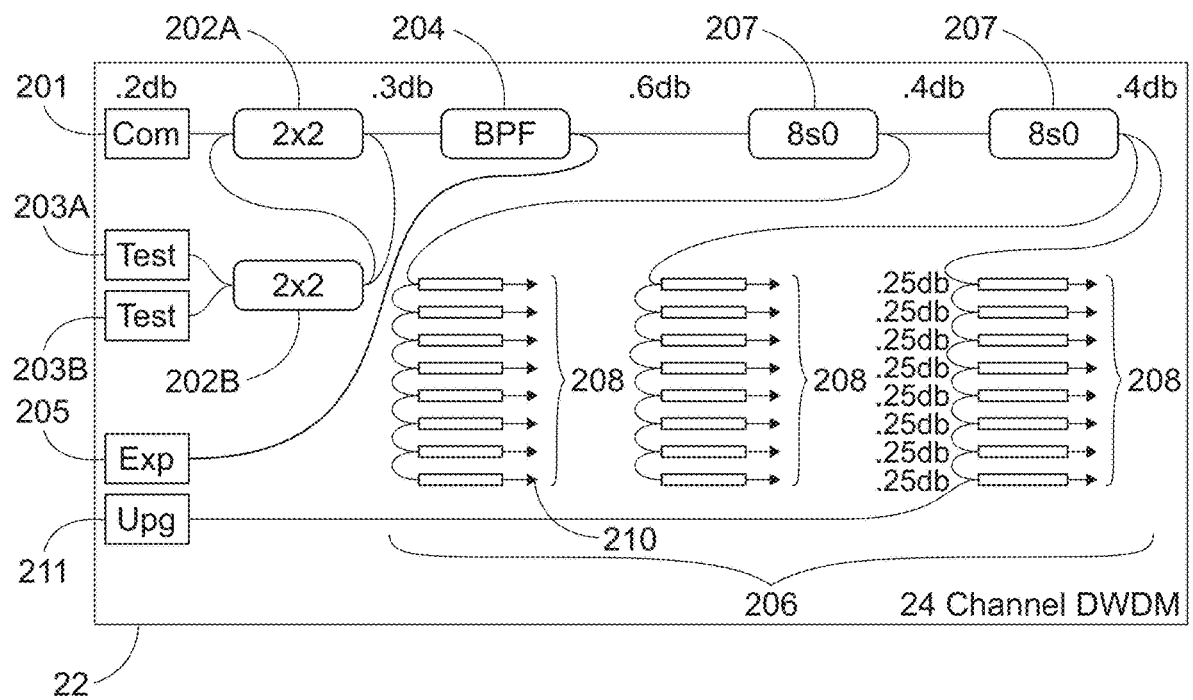
FIG. 9A illustrates a schematic view of an example of a twenty-four (24) channel DWDM fiber optic module, according to an example embodiment.
Figure 9B:
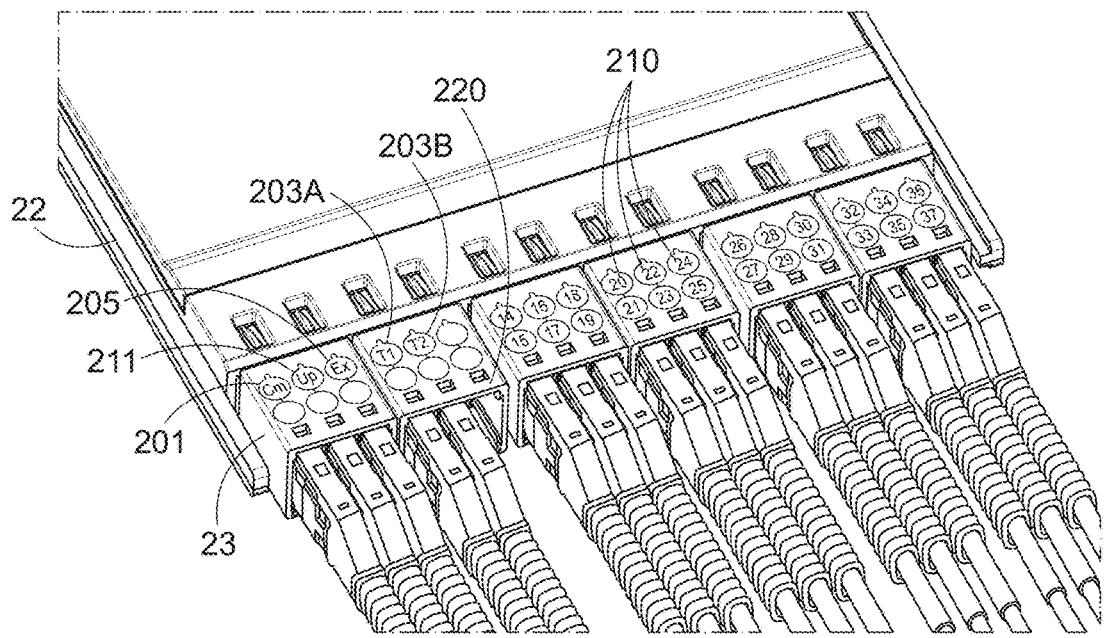
FIG. 9B illustrates an example fiber optic connection arrangement for the twenty-four (24) channel DWDM fiber optic module of FIG. 9A, according to an example embodiment.

FIG. 9A illustrates a schematic view of an example of a twenty-four (24) channel DWDM fiber optic module 22. FIG. 9B illustrates an example fiber optic connection arrangement for the twenty-four (24) channel DWDM fiber optic module 22 of FIG. 9A. As used in this disclosure, optical components being "connected to" each other refers to an optical path being established between the components. An input fiber may be connected to a common port 201, e.g. "COM" or "CM". The input fiber may be configured to carry up to forty-eight DWDM channel signals. The common port 201 may be in communication with one or more splitters 202, such as a 98/2 splitter 202A and a 50/50 splitter 202B that divide the optical power into two paths according to the power splitting ratio. The 50/50 splitter 202B may receive an input from both the input and output of the 98/2 splitter 202A and output the received signals to test ports 203A, 203B "T1, T2". In some embodiments, a bandpass filter (not shown) may be provided between the common port 201 and the splitter 202A, 202B and/or the test port 203A, 203B. The bandpass filter may pass an optical signal used for optical time domain reflectometer (OTDR) device testing of the fiber optic module 22. In an example embodiment an isolator, such as a 1550 nm isolator, may be disposed between the 50/50 splitter 202B and a test port, such as test port 203B.

An output of the 98/2 splitter 202A, may be in communication with an express bandpass filter 204. The express bandpass filter 204 may be configured to pass a signal to an express port 205 and a plurality of DWDM channels to the DWDM filters 206. The DWDM filters 206 may include a plurality of group bandpass filters 207 configured to pass the signal for eight (8) adjacent DWDM channels. The group bandpass filter 207 may be an eight-skip-zero (8s0) filter. Such filters can perform the function of separating a plurality of adjacent DWDM channel wavelengths, e.g. eight DWDM channels, from the optical signal. The output of the group bandpass filter 207 may be in communication with a plurality of DWDM channel filters 208. Each of the DWDM channel filters 208 may be a bandpass filter configured to pass a specific DWDM channel signal. The DWDM channel filters 208 may be in communication with an output channel connection 210. In the depicted embodiment, the fiber optic module 22 includes output channels 14-37 corresponding to twenty-four (24) DWDM channels.

In an example embodiment, the output of the last group bandpass filter 207 may also be in communication with an upgrade "Upg" port 211. The Upgrade port 211 may enable the signal for additional DWDM channels to be passed to a downstream fiber optic module. In the embodiment depicted in FIG. 9A, the third group of DWDM channels are not passed by a group bandpass filter 207. The upgrade port 211 is connected in parallel with the DWDM channel filter 208. In other embodiment, a group bandpass filter 207 may be disposed to pass the third group of DWDM channel signals and the remaining signal is passed to the upgrade port 211, as depicted in FIG. 11.

Figure 10:
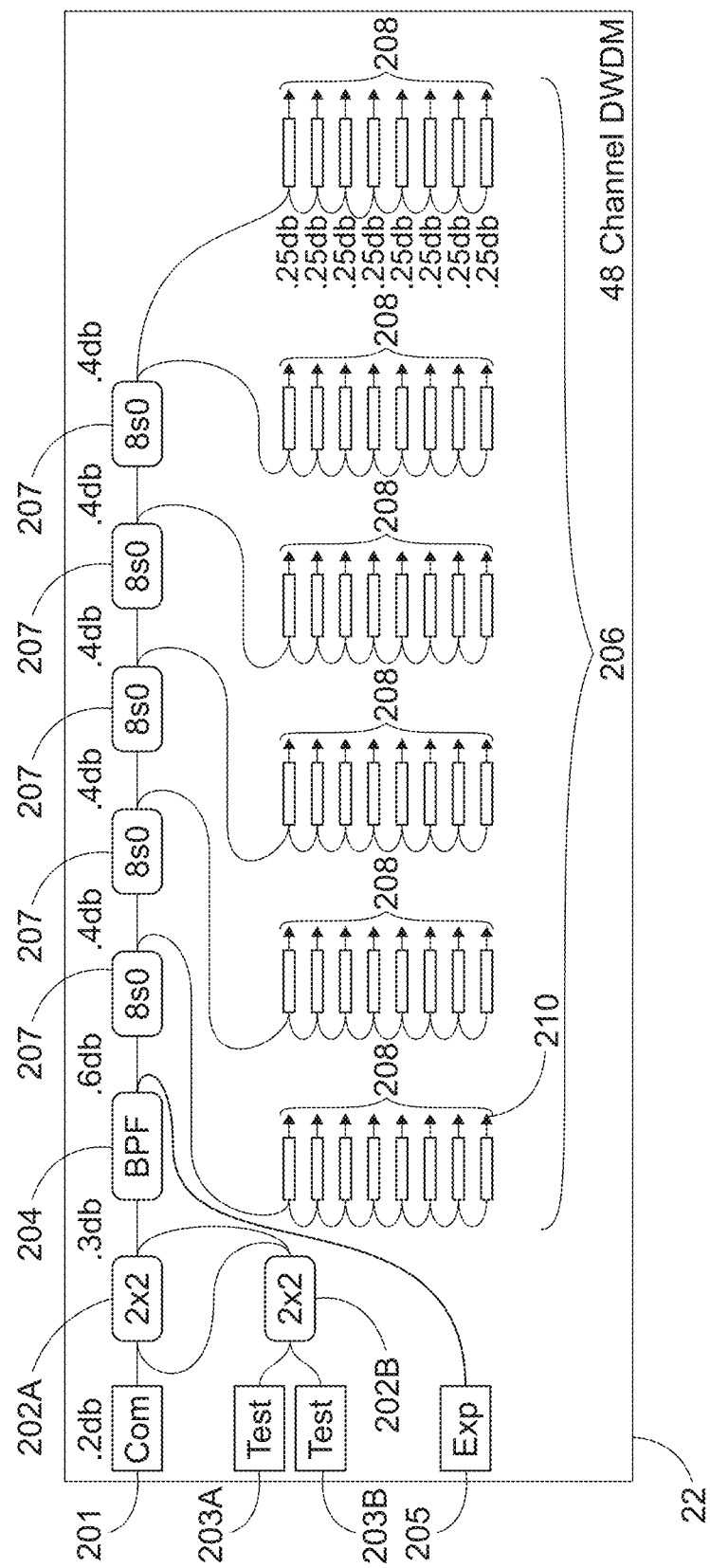
FIG. 10 illustrates a schematic view of an example of a forty-eight (48) channel DWDM fiber optic module, according to an example embodiment.

FIG. 10 illustrates a schematic view of an example of a forty-eight (48) channel DWDM fiber optic module 22". The fiber optic module 22" of FIG. 10 may be substantially similar to fiber optic module 22 of FIG. 9A, except as detailed below. The forty-eight (48) channel DWDM fiber optic module 22" may include twenty-four (24) additional DWDM channels. The twenty-four (24) additional DWDM channels may include additional group bandpass filters 207 passing eight (8) adjacent channels to eight (8) DWDM channel filters 208. The forty-eight (48) channel DWDM fiber optic module 22 may have an accumulated loss of approximately 3.10 dB. Some example losses contributing to the total loss may include a loss associated with the input connection, e.g. common port 201, of approximate 0.2 dB, a loss associated with the 98/2 splitter 202A of approximately 0.3 dB, a loss associated with the express bandpass filter 204 of approximately 0.6 dB, a loss associated with each group bandpass filter 207 of approximately 0.4 dB, and a loss associated with the DWDM channel filters 208 of approximately 0.25 dB. The As a comparison, the twenty-four (24) DWDM channel module 22 depicted in FIG. 9A may have an accumulated loss of approximately 1.9 dB.

Figure 11:
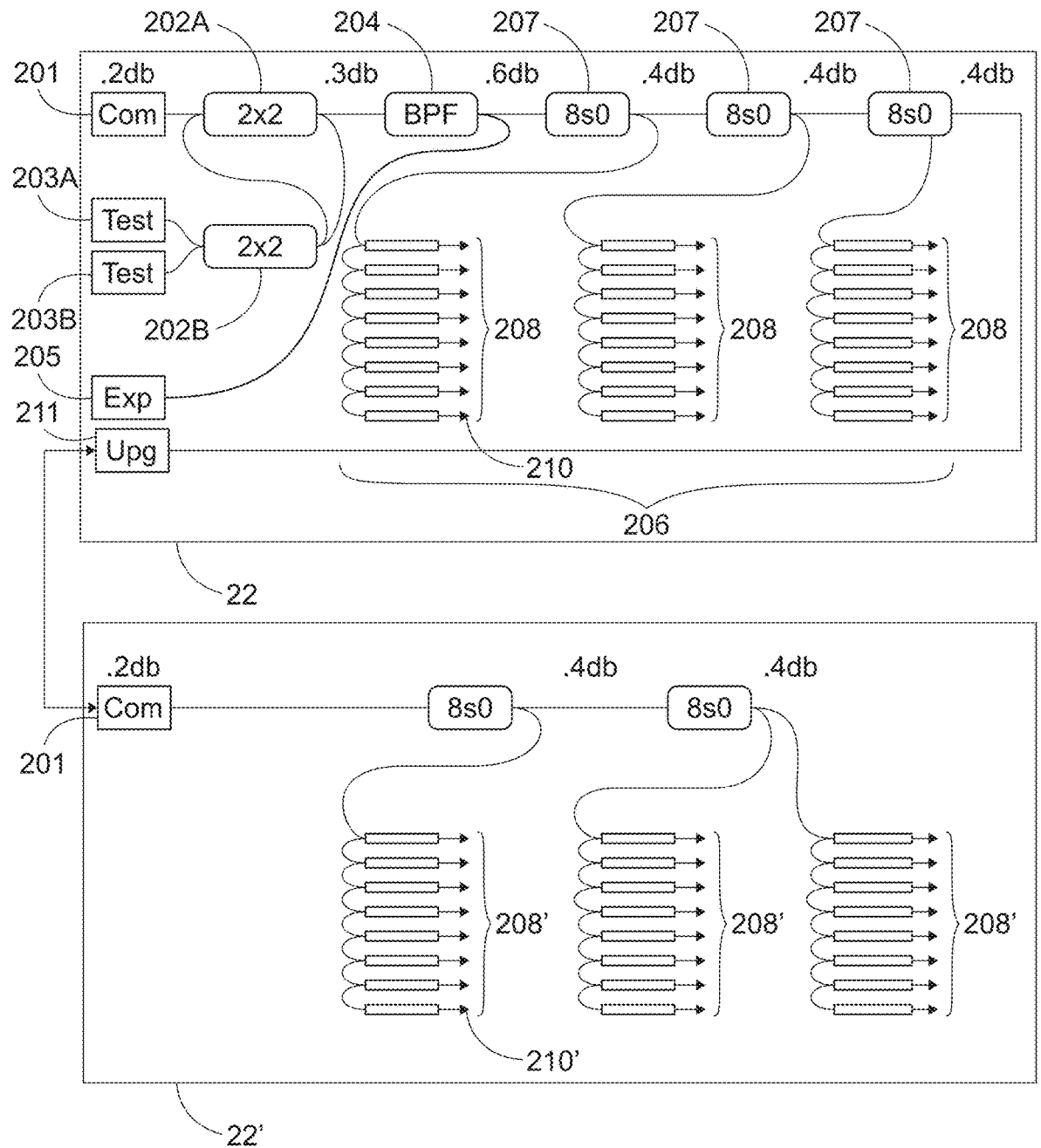
FIG. 11 is a schematic view of an example of a twenty-four (24) channel DWDM fiber optic module and a twenty-four channel DWDM expansion fiber optic module, according to an example embodiment.

FIG. 11 a schematic view of an example of a twenty-four (24) channel DWDM fiber optic module 22 and a twenty-four (24) channel DWDM expansion fiber optic module 22'. The twenty-four (24) channel DWDM fiber optic module 22 may include a third group bandpass filter 207, which may pass the third group of DWDM channel signals to the respective DWDM channel filters 208. The remaining signal may be passed to the upgrade port 211. The third group bandpass filter 207 while not necessary for a twenty-four (24) DWDM channel utilization may optimize expansion to thirty-six (36) or forty-eight (48) DWDM channel utilization.

The twenty-four (24) channel DWDM expansion fiber optic module 22' may include two group bandpass filters 207 and twenty-four (24) channel filters 208 arranged similar to the twenty-four (24) channel DWDM fiber optic module 22 described in reference to FIG. 9A. However, the twenty-four (24) channel DWDM expansion fiber optic module 22' may have a reduced accumulated loss when compared to traditional expansion units. In an example embodiment, the twenty-four (24) channel DWDM expansion fiber optic module 22' does not include the test ports 203A, 203B, or express port 205, which in turn enables the twenty-four (24) channel DWDM expansion fiber optic module 22' to not include the associated splitters 202A, 202B, and express bandpass filter 207. The loss savings of this configuration may be approximately 1.6 dB. As such, the forty-eight (48) DWDM channels provided by the twenty-four (24) channel DWDM fiber optic module 22 and the twenty-four (24) channel DWDM expansion fiber optic module 22' may have only 0.4 dB greater loss than a standard forty-eight (48) channel DWDM fiber optic module 22". The twenty-four (24) channel DWDM expansion fiber optic module 22' is merely an example expansion module, other expansion modules are contemplated, for example a twelve (12) channel DWDM expansion fiber optic module containing one (1) six-skip-zero (6s0) group bandpass filter and twelve channel filters.

Figure 12:
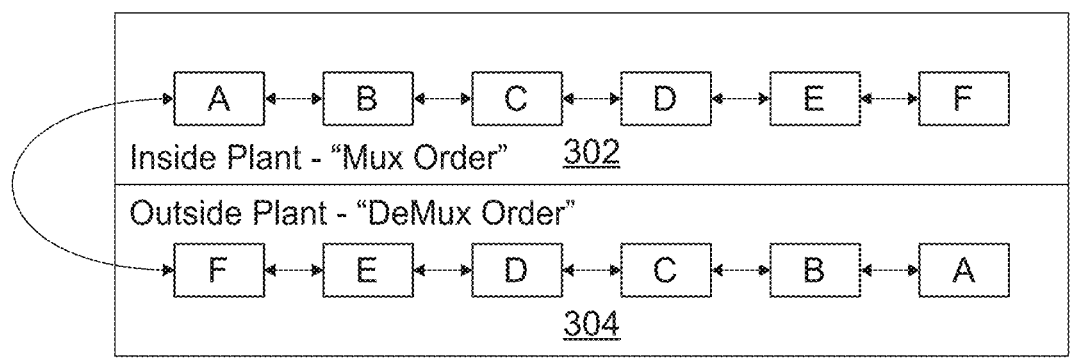
FIG. 12 is a block diagram of a DWDM multiplexing and demultiplexing configuration for forty-eight (48) DWDM channels, according to an example embodiment.

FIG. 12 is block diagram of a DWDM multiplexing configuration for forty-eight (48) DWDM channels according to an example embodiment. DWDM channels may be deployed in channel groups, such as 8 channels per channel group, 6 channels per channel group, or the like. In the examples depicted in FIGS. 12-14, an inside plant (ISP) fiber optic module 302 and outside plant (OSP) fiber optic module 304 each include DWDM channels that are arranged in groups of eight (8) DWDM channels. These channel groups of eight (8) DWDM channels are represented and referred to by reference indicators A-F to simplify the figures and discussion below.

The accumulated loss of the ISP DWDM fiber optic modules 302 is also present in the OSP fiber optic modules 304 on the opposite end of the optical signal. Because the accumulated loss is highest at the last set of DWDM channels, e.g. DWDM channel group F, the DeMux order at the OSP fiber optic modules 304 (F-A) may be opposite of the Mux order of the ISP fiber optic modules 302 (A-F).

Figure 13:
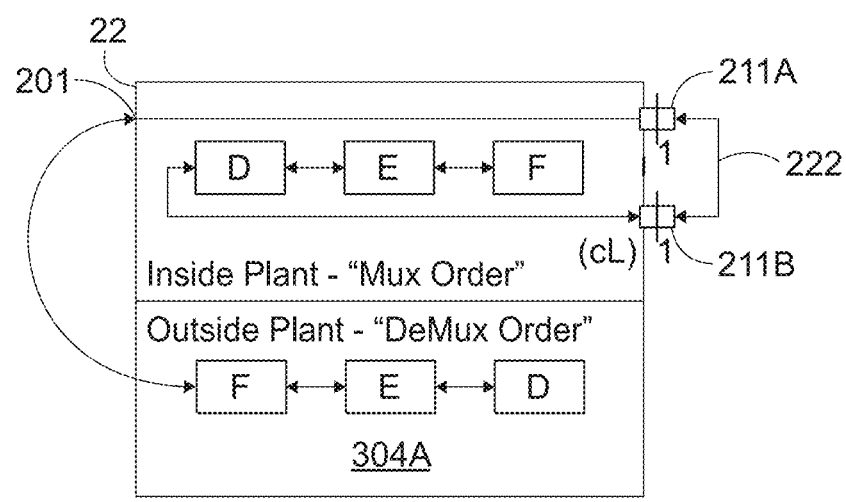
FIG. 13 is a block diagram of a DWDM multiplexing and demultiplexing configuration for a twenty-four (24) channel DWDM fiber optic module with a loopback feature, according to an example embodiment.

In an example in which only twenty-four (24) DWDM channels are utilized, the fiber optic module 22 discussed above in FIG. 11 may include a loopback feature. FIG. 13 is a block diagram of a DWDM multiplexing configuration for a twenty-four (24) channel DWDM fiber optic module 22 with a loopback feature, according to an example embodiment. Referring to FIGS. 13 and 9A, the loopback feature may include a first input connection, e.g. the "common" port 201, directly coupled to an output connection, e.g. the upgrade port 211, and a second input connection connected to the first plurality of optical filters. The loopback feature may embodied as a connector disposed on either end of an optical fiber. In another example embodiment, the output connection and the second input connection may be disposed in the same duplex connector port, e.g. the top optical connection 211A and bottom optical connection 211B of the upgrade port 211. The loopback adaptor 222 may include a duplex connector having a optical fiber connected to between the two ports of the connector. The optical fiber may extend from the loopback adaptor 222 or may be housed within a connector body. In this manner, a loopback adapter 222 may be installed in the upgrade port 211 with a ~0 dB loss, such as a 0.2 dB loss for the associated connectors, resulting in a 0.4 dB loss across the loopback adapter. This enables the outside plant DeMux order to be maintained for the initial deployment of twenty-four (24) DWDM channels (DWDM channel groups F-D) and enable expansion to forty-eight (48) DWDM channels (DWDM channel groups A-F), by adding an additional twenty-four (24) DWDM channels (DWDM channel groups A-C) without disrupting service to the first twenty-four (24) DWDM channels (DWDM channel groups D-F), as described below in reference to FIG. 14.

As depicted in FIG. 13, the input to the fiber optic module 22 is passed directly from the common port 201 to the upgrade port top connection 211A. The loopback adapter 222 passes the optical signal from the upgrade port top connection 211A to the upgrade port bottom connection 211B. The loopback adapter 222 may have a ~0 dB loss, or if attenuation is desired a calibrated attenuation may be provided. The upgrade port bottom connection 211B passes the optical signal to the optical filters of DWDM channel groups D-F corresponding to the OSP fiber optic modules 304A DWDM channel group order of F-D.

Figure 14:
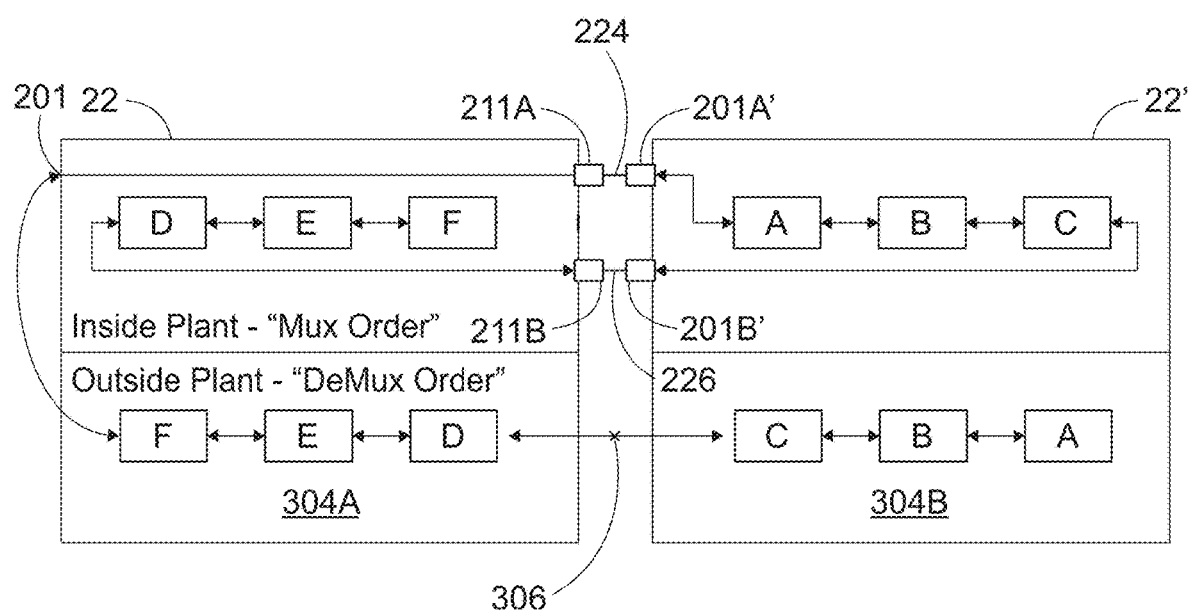
FIG. 14 is a block diagram of a DWDM multiplexing and demultiplexing configuration for a twenty-four (24) channel DWDM fiber optic module connected to an twenty-four (24) channel DWDM expansion fiber optic module using the loopback feature, according to an example embodiment.

Turning to FIG. 14, a DWDM multiplexing configuration for a twenty-four (24) channel DWDM fiber optic module 22 connected to a twenty-four (24) channel DWDM expansion fiber optic module 22' using the loopback feature is shown. The input signal is passed directly through the fiber optic module 22 to the upgrade port top connection 211A, as described above. Similar to the upgrade port 211 of the fiber optic module 22, the common port top connection 201A' may be used as the common input, and the common port bottom connection 201B' may be used as an output from the expansion fiber optic module 22'. This may enable a single jumper cable with two optical fibers 224, 226 and duplex connectors to pass the optical signals between the fiber optic module 22 and the expansion fiber optic module 22'. The upgrade port top connection 211A may be connected to the common port 201' of the expansion fiber optic module 22' by a first optical fiber 224. The expansion fiber optic module 22' includes DWDM channel groups A-C. The output of the expansion fiber optic module 22' may be passed to the common port bottom connection 201B' which is in turn connected to the upgrade port bottom connection 211B by a second optical fiber 226. The fiber optic module 22 includes DWDM channel groups D-F. On the receiving end of the signal, additional fiber optic modules 304B associated with DWDM channel groups C-A may be spliced with the first OSP fiber optic modules 304A associated with DWDM channel groups F-D. In this way, the addition of twenty-four (24) ISP DWDM channels enables the DeMux order OSP fiber optic modules 304A, 304B to be maintained. The use of the bottom and top optical connections of the upgrade and common port are merely for illustrative purposes, and any available optical port may be used to connect the fiber optic module 22 to the expansion fiber optic module 22'.

Figure 15A:
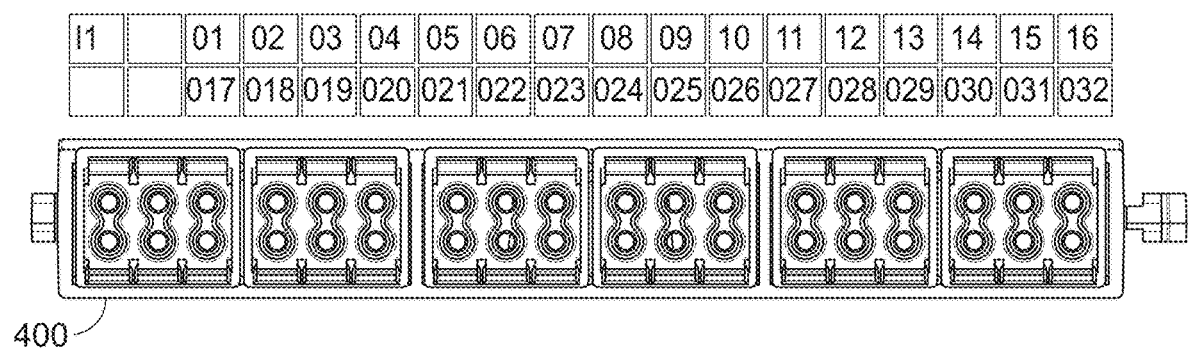
FIGS. 15A and 15B are a front view and perspective view of a fiber optic splitter module according to an example embodiment.
Figure 15B:
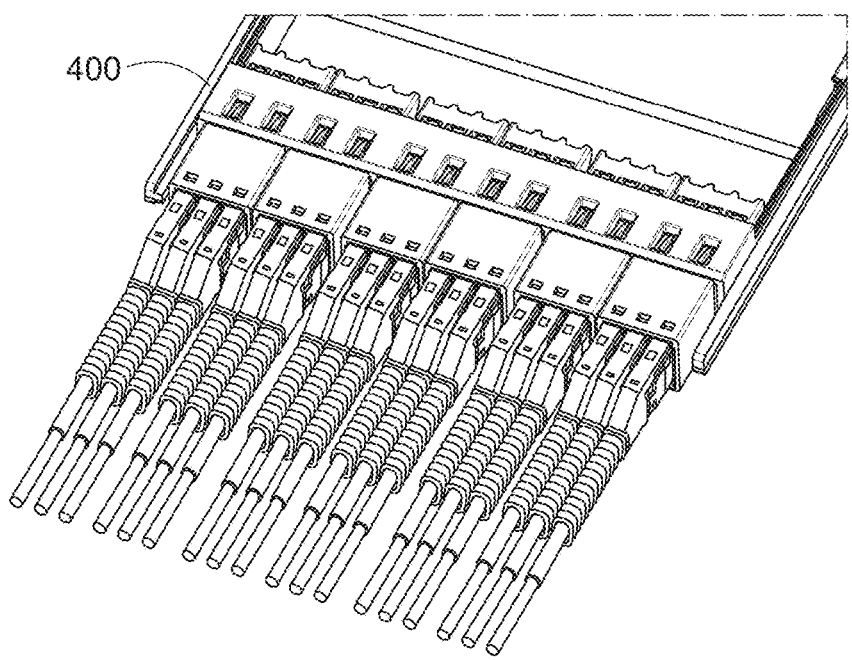

FIGS. 15A and 15B are a front view and perspective view of an example fiber optic splitter module 400, according to an example embodiment. The splitter module 400 may include a body, cover and fiber optic components, similar to the body 102, cover 104 and fiber optic components 23 discussed above in reference to the fiber optic module 22 of FIG. 4. The splitter module 400 may include an input connection I1 and a plurality, such as thirty-two (32), output connections O1-O32. A splitter chip may be disposed in the fiber routing volume of the splitter module 400 and configured to split the input signal into a plurality of output signals provided on each of the plurality of output connections.

In an example embodiment a fiber optic assembly is provided including a body defining a fiber routing volume, a plurality of fiber optic components disposed in a front side of the body, and a plurality of optical filters disposed within the fiber routing volume, wherein the plurality of optical filters enable at least twenty four (24) dense wavelength division multiplexing (DWDM) channels.

In an example embodiment, the fiber optic routing volume comprises less than 233,280 mm3. In some example embodiments, the plurality of optical filters include a plurality of thin film filters. In an example embodiment, the plurality of optical filters include a plurality of bandpass filters and a plurality of DWDM channel filters. In some example embodiments, the plurality of bandpass filters include eight-skip-zero (8s0) filters. In an example embodiment, the fiber optic assembly also includes a plurality of filter cradles configured to retain the optical filters in a predetermined position within the fiber routing volume. The filter cradles are disposed to enable fiber routing with bend radii of greater that about 15 mm. In some example embodiments, the plurality of filter cradles includes first and second sets of two filter cradles. The two filter cradles of the first set of two filter cradles are disposed proximate to a first side edge of the body at about one-third (⅓) and about two-thirds (⅔) a length of the fiber optic assembly, respectively, and the two filter cradles of the second set of two filter cradles are disposed proximate to a second side edge of the body at about one-third (⅓) and about two-thirds (⅔) the length of the fiber optic assembly, respectively. In an example embodiment, the fiber optic assembly also includes a plurality of fiber routing guides configured to route optical fibers in a figure eight pattern between the plurality of optical filters and the plurality of fiber optic components. In some example embodiments, the plurality of fiber cradles are each configured to retain some of the plurality of optical filters in two stacked rows. In an example embodiment, the two stacked rows includes a first row optical filters and a second row of optical filters, the second row of optical filters defines valleys between adjacent optical filters in the second row of optical filters, and the optical filters in the first row of optical filters are disposed in the valleys defined by the second row of optical filters such that the first row of optical filters is offset from the second row of optical filters. In some example embodiments, the plurality of filter cradles are further configured to retain a plurality of splice protection sleeves. In an example embodiment, the plurality of filter cradles further include an integral fiber routing guide. In some example embodiments, the integral fiber routing guide is disposed proximate to the first side edge or second side edge. In an example embodiment, the plurality of fiber optic components includes at least one dual-ferrule very small form factor (VSFF) component. In an example embodiment, the body also includes a side edge and at least one sidewall extending from the side edge. In some example embodiments, the fiber optic assembly also includes a cover configured to engage the sidewall and at least partially enclose the fiber routing volume. In an example embodiment, the fiber optic assembly also includes a first plurality of filter cradles disposed on the body and a second plurality of filter cradles disposed on the cover opposite the first plurality of filter cradles. The first plurality of filter cradles and the second plurality of filter cradles are configured to retain the optical filters in a predetermined position within the fiber routing volume.

In another example embodiment, a fiber optic apparatus is provided including a chassis. The chassis is configured to support a fiber optic connection density of at least one hundred ninety-two (192) wavelength division multiplexing (WDM) channels per U space, based on using at least one duplex fiber optic component. In an example embodiment, the chassis is configured to support a fiber optic connection density of at least two hundred eighty-eight (288) WDM channels per U space. In some example embodiments, the chassis is configured to support a fiber optic connection density of at least three hundred sixty (360) WDM channels per U space. In an example embodiment, the at least one duplex fiber optic component includes at least one dual-ferrule very small form factor (VSFF) component. In some example embodiments, the WDM channels are dense wavelength division multiplexing (DWMD) channels. In an example embodiment, the fiber optic apparatus also includes a plurality of fiber optic equipment trays supported by the chassis and a plurality of fiber optic assemblies configured to be installed in the plurality of fiber optic equipment trays. Each fiber optic assembly of the plurality of fiber optic assemblies includes a front side configured to support the at least duplex fiber optic component, a fiber routing volume, and a plurality of optical fibers disposed within the fiber routing volume and arranged to establish optical connections between an input fiber optic component and at least one output fiber optic component. In some example embodiments, each fiber optic equipment tray of the plurality of fiber optic equipment trays is configured to receive multiple fiber optic assemblies of the plurality of fiber optic assemblies. In an example embodiment, a U space includes a height of 1.75 inches and comprises a width of 19 inches or 23 inches. In some example embodiments, the at least one duplex fiber optic component includes a plurality of dual-ferrule very small form factor (VSFF) adapters, wherein each duel-ferrule VSFF adapter is configured to receive three (3) duel-ferrule VSFF connectors.

In a further example embodiment, a fiber optic apparatus is provided including a chassis. The chassis is configured to support a fiber optic connection density of at least four hundred thirty-two (432) fiber optic connections per U space, based on using at least one dual-ferrule very small form factor (VSFF) component.

In an example embodiment, the chassis is configured to support a fiber optic connection density of at least four hundred eighty-six (486) fiber optic connections per U space. In some example embodiments, the chassis is configured to support a fiber optic connection density of at least five hundred fifty-eight (558) fiber optic connections per U space.

In an example embodiment, the at least one dual-ferrule VSFF component comprises at least two hundred sixteen (216) dual-ferrule VSFF components. In some example embodiments, a U space comprises a height of 1.75 inches and comprises a width of 19 inches or 23 inches.

In still a further example embodiment, a fiber optic system is provided including a first fiber optic assembly and a second fiber optic assembly. The fiber optic assembly including a first body defining an first fiber routing volume, a plurality of fiber optic components disposed on the first body, and a first plurality of optical filters disposed within the first fiber routing volume. At least some of the first plurality of optical filters are connected to at least some of the first plurality of fiber optic components to define a first plurality of dense wavelength division multiplexing (DWDM) channels, test channels, an express port, and an upgrade port. The second fiber optic assembly includes a second body defining a second fiber routing volume, a second plurality of fiber optic components disposed on the second body, and a second plurality of optical filters disposed within the second fiber routing volume. At least some of the second plurality of optical filters is connected to at least some of the second plurality of fiber optic components to define a second plurality of DWDM channels. The test channels and the express port of the first fiber optic assembly are utilized for both the fiber optic assembly and the second fiber optic assembly.

In an example embodiment, the first plurality of DWDM channels includes at least twenty-four (24) DWDM channels. In some example embodiment, the second plurality of DWDM channels includes at least twelve (12) DWDM channels. In an example embodiment the second plurality of DWDM channels includes at least twenty-four (24) DWDM channels. In some example embodiments, an input fiber connection of the second fiber optic assembly is connected to the upgrade port of the first fiber optic assembly. In an example embodiment, the first plurality of optical filters includes a first eight-skip-zero (8s0) filter coupled to a first group of eight (8) DWDM channel filters, a second 8s0 filter coupled to a second group of eight (8) DWDM channel filters, and a third group of eight (8) DWDM channel filters. In some example embodiments, an input to the upgrade port is connected to a DWDM channel filter of the third group of 8 DWDM channel filters. In an example embodiment, the first fiber optic assembly also includes a third 8s0 filter coupled to the third group of eight (8) DWDM channel filters, and the upgrade port is connected to an output of the third 8s0 filter. In some example embodiments, the second plurality of optical filters includes a fourth 8s0 filter coupled to a fourth group of eight (8) DWDM channel filters, a fifth 8s0 filter coupled to a fifth group of eight (8) DWDM channel filters, and a sixth group of eight (8) DWDM channel filters. In an example embodiment, the second fiber optic assembly includes a loopback feature. The loopback feature comprises a first input fiber optic component directly connected to an output fiber optic component and a second input fiber optic component coupled to the first plurality of optical filters. In some example embodiments, the fiber optic system also includes a loopback connector configured to connect the output fiber optic component to the second input fiber optic component. In an example embodiment, the output fiber optic component and the second input fiber optic component are disposed in a duplex fiber optic adapter. In some example embodiment, the fiber optic system of also includes a first fiber optic jumper connecting the output fiber optic component of the first fiber optic assembly to an input fiber optic component of the second fiber optic assembly and a second jumper connecting an output fiber optic component of the second fiber optic assembly to the second input fiber optic component of the first fiber optic assembly. In an example embodiment, the first plurality of fiber optic components or second plurality of fiber optic components includes at least one dual-ferrule very small form factor (VSFF) component. In some example embodiments, the fiber optic system also includes a chassis configured to support a plurality of fiber optic assemblies. The chassis is configured to support a fiber optic connection density of at least two hundred eighty-eight (288) DWDM channels per U space, based on using at least one duplex fiber optic component. In an example embodiment, a U space comprises a height of 1.75 inches and comprises a width of 19 inches or 23 inches. In some example embodiments, the first body includes a width of about 90 mm, a height of about 12 mm, and a depth of about 216 mm. In an example embodiment, the first plurality of optical filters includes a plurality of thin film filters. In some example embodiment, the second plurality of optical filters includes a plurality of thin film filters.

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic equipment, fiber optic assembly, fiber optic equipment tray, features included in the fiber optic equipment tray. Any size equipment, including but not limited to 1-U, 2-U and 4-U sizes may include some or all of the aforementioned features and fiber optic assemblies or modules disclosed herein and some or all of their features. Further, the modifications are not limited to the type of fiber optic equipment tray or the means or device to support fiber optic modules installed in the fiber optic equipment trays. The fiber optic modules can include any fiber optic connection type, including but not limited to fiber optic connectors and adapters, and number of fiber optic connections, density, etc.

Further, as used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode or Singlemode fiber commercially available from Corning Incorporated.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:
1. A fiber optic apparatus, comprising:
a chassis;
wherein the chassis is configured to support a fiber optic connection density of at least one hundred ninety-two (192) wavelength division multiplexing (WDM) channels per U space, based on using at least one duplex fiber optic component;
a plurality of fiber optic equipment trays supported by the chassis; and
a plurality of fiber optic assemblies configured to be installed in the plurality of fiber optic equipment trays, wherein each fiber optic assembly of the plurality of fiber optic assemblies comprises a front side configured to support the at least one duplex fiber optic component, a fiber routing volume, and a plurality of optical fibers disposed within the fiber routing volume and arranged to establish optical connections between an input fiber optic component and at least one output fiber optic component.

2. The fiber optic apparatus of claim 1, wherein the chassis is configured to support a fiber optic connection density of at least two hundred eighty-eight (288) WDM channels per U space.

3. The fiber optic apparatus of claim 1, wherein the chassis is configured to support a fiber optic connection density of at least three hundred sixty (360) WDM channels per U space.

4. The fiber optic apparatus of claim 1, wherein the at least one duplex fiber optic component comprises at least one dual-ferrule very small form factor (VSFF) component.

5. The fiber optic apparatus of claim 1, wherein the WDM channels are dense wavelength division multiplexing (DWMD) channels.

6. The fiber optic apparatus of claim 1, wherein each fiber optic equipment tray of the plurality of fiber optic equipment trays is configured to receive multiple fiber optic assemblies of the plurality of fiber optic assemblies.

7. The fiber optic apparatus of claim 1, wherein the at least one duplex fiber optic component comprises a plurality of dual-ferrule very small form factor (VSFF) adapters, wherein each dual ferrule VSFF adapter is configured to receive three (3) dual ferrule VSFF connectors.

8. The fiber optic apparatus of claim 7, wherein the plurality of VSFF adapters comprises a plurality of MDC adapters.

9. The fiber optic apparatus of claim 8, wherein the plurality of VSFF adapters comprises SN adapters.

* * * * *

UNITED STATES PATENT AND TRADEMARK OFFICE
CERTIFICATE OF CORRECTION

PATENT NO. : 11,719,901 B2
APPLICATION NO. : 17/592660
DATED : August 8, 2023
INVENTOR(S) : Terry Dean Cox et al.

It is certified that error appears in the above-identified patent and that said Letters Patent is hereby corrected as shown below:

In the Claims

In Column 18, Line 44, in Claim 5, delete "(DWMD)" and insert -- (DWDM) --.

In Column 18, Line 52, in Claim 7, delete "dual ferrule" and insert -- dual-ferrule --.

In Column 18, Line 53, in Claim 7, delete "dual ferrule" and insert -- dual-ferrule --.

Signed and Sealed this
Second Day of January, 2024

Katherine Kelly Vidal
*Director of the United States Patent and Trademark Office*